United States Patent
Tseng

(10) Patent No.: US 8,570,315 B2
(45) Date of Patent: Oct. 29, 2013

(54) METHOD FOR FULLY AUTOMATICALLY ALIGNING QUALITY OF IMAGE

(75) Inventor: Shih-Hua Tseng, Taipei (TW)

(73) Assignee: Tatung Company, Taipei (TW)

( * ) Notice: Subject to any disclaimer, the term of this patent is extended or adjusted under 35 U.S.C. 154(b) by 860 days.

(21) Appl. No.: 12/727,244

(22) Filed: Mar. 19, 2010

(65) Prior Publication Data

US 2010/0238185 A1 Sep. 23, 2010

(30) Foreign Application Priority Data

Mar. 20, 2009 (TW) ................................. 98109193 A

(51) Int. Cl.
*G06F 3/038* (2013.01)
(52) U.S. Cl.
USPC ........... 345/213; 710/305; 345/202; 345/536; 345/214; 345/698; 345/99
(58) Field of Classification Search
None
See application file for complete search history.

(56) References Cited

U.S. PATENT DOCUMENTS

| | | | |
|---|---|---|---|
| 5,652,845 A | 7/1997 | Arai et al. | |
| 5,887,147 A | 3/1999 | Arai et al. | |
| 6,247,090 B1 | 6/2001 | Arai et al. | |
| 6,504,533 B1* | 1/2003 | Murayama et al. | 345/204 |
| 6,513,088 B2 | 1/2003 | Arai et al. | |
| 6,549,970 B2* | 4/2003 | Arai et al. | 710/305 |
| 7,145,579 B2* | 12/2006 | Arai et al. | 345/690 |
| 2007/0013701 A1* | 1/2007 | Segawa et al. | 345/502 |
| 2010/0312981 A1* | 12/2010 | Kajimura | 711/167 |

* cited by examiner

*Primary Examiner* — Xiao M. Wu
*Assistant Examiner* — Greg Raburn
(74) *Attorney, Agent, or Firm* — Jianq Chyun IP Office

(57) ABSTRACT

A method for fully-automatically aligning the quality of an image is provided. The method processes the video signals provided by the Video Graphic Array (VGA) display card in the computer system through the multi-sync display itself, and further interprets whether a computer host ID stored in the VGA display card or the computer host matches with a computer host ID stored in the multi-sync display, so as to avoid repetitious aligning to the same computer system, and achieve full automatic aligning to the quality of the image displayed on the multi-sync display. Therefore, even if the multi-sync display is situated under different computer hosts or VGA display cards and placed where an user cannot touch, the inconvenience of pressing a button on the multi-sync display to align the quality of the image displayed on the multi-sync display in conventional techniques can be prevented.

19 Claims, 5 Drawing Sheets

| First Computer Host ID |||
|---|---|---|
| Display ID || Counter ID |
| Color Level Flag |||
| Preset Color Level Alignment Value |||
| First Preset Timing Flag | First Preset Timing Parameter | First Preset Timing Alignment Value |
| Second Preset Timing Flag | Second Preset Timing Parameter | Second Preset Timing Alignment Value |
| ⋮ | ⋮ | ⋮ |
| First Self-Set Timing Flag | First Self-Set Timing Parameter | First Self-Set Timing Alignment Value |
| Second Self-Set Timing Flag | Second Self-Set Timing Parameter | Second Self-Set Timing Alignment Value |

FIG. 2A

| Reference Timing Parameter (Previous Timing Parameter or Invalid Timing Parameter) ||
|---|---|
| Current Timing Parameter | Current Timing Alignment Value |

FIG. 2B

| Invalid Computer Host ID or Second Computer Host ID |
|---|

FIG. 2C

METHOD FOR FULLY AUTOMATICALLY ALIGNING QUALITY OF IMAGE

CROSS-REFERENCE TO RELATED APPLICATION

This application claims the priority benefit of Taiwan application serial no. 98109193, filed on Mar. 20, 2009. The entirety of the above-mentioned patent application is hereby incorporated by reference herein and made a part of specification.

BACKGROUND OF THE INVENTION

1. Field of the Invention

The present invention generally relates to an alignment technology for an image of a multi-sync display, and more particularly, to a method for fully-automatically aligning the quality of the image displayed on the multi-sync display.

2. Description of Related Art

Generally speaking, the requirement for the image quality displayed on a computer display (also could be called a "multi-sync display") is far higher than for a television. Moreover, there are various manufacturers manufacturing a Video Graphic Array (VGA) display card. Accordingly, when a same multi-sync display is used for display under different computer hosts and different VGA display cards, the images displayed on the multi-sync display could have problems such as the color shift and/or the deviations of size and position. In order to solve such problems, in conventional technologies a button is fabricated on the multi-sync display to call an on-screen display (OSD) menu for an user to make selections. Additionally, the images displayed on the multi-sync display would be aligned by changing an image signal and a horizontal and vertical synchronization signal provided by the VGA display card of the computer system. Therefore, the multi-sync display could display the optimal images for the user to watch.

In light of the foregoing, in order to mitigate the problems of the color shift and/or the deviations of size and position of the images displayed on the multi-sync display in conventional technologies, a manual pressing of the button of the multi-sync display is relied upon to coordinate with the alignment mechanism of the computer system. However, when a placement of the multi-sync display is unapproachable to the user, the conventional solution for solving the problems of the color shift and/or the deviations of size and position of the images displayed on the multi-sync display is inconvenient and insufficient.

SUMMARY OF THE INVENTION

Accordingly, an aspect of the present invention provides a method for fully-automatically aligning the quality of an image, which capable of preventing an inconvenience in conventional techniques for an user of a multi-sync display situated under different computer hosts or VGA display cards and placed where the user cannot touch it, where the user has to press a button on the multi-sync display to align the quality of the image displayed on the multi-sync display.

The method for fully-automatically aligning the quality of the image according to the embodiments of the present invention, the multi-sync display is used to process the video signals (e.g., the image signal and the horizontal and vertical synchronization signal) provided by the VGA display card in the computer system through a system control program itself, and furthermore, the computer host ID stored in the computer host or the VGA display card is compared with the computer host ID stored in the multi-sync display to determine whether the computer host IDs match by a device driving program built-in/embedded-in the computer system responding to the request of the system control program, so as to prevent a repetitious alignments to a same computer system. Accordingly, fully-automatic alignment to the quality of the image displayed on the multi-sync display can be achieved.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a schematic diagram illustrating a first memory configuration of an EEPROM timing data table according to an exemplary embodiment of the present invention.

FIG. 2B is a schematic diagram illustrating a third memory configuration of a RAM timing data table according to an exemplary embodiment of the present invention.

FIG. 2C is a schematic diagram illustrating a second memory configuration of a non-volatile memory in a VGA display card according to an exemplary embodiment of the present invention.

DESCRIPTION OF EMBODIMENTS

Reference will now be made in detail to the present preferred embodiments of the invention, examples of which are illustrated in the accompanying drawings.

The technical features and technical effects of several embodiments of the present invention are described in detail as follows for reference. In addition, whenever possible, identical or similar reference numbers stand for identical or similar elements in the figures and the embodiments.

Figure 1:
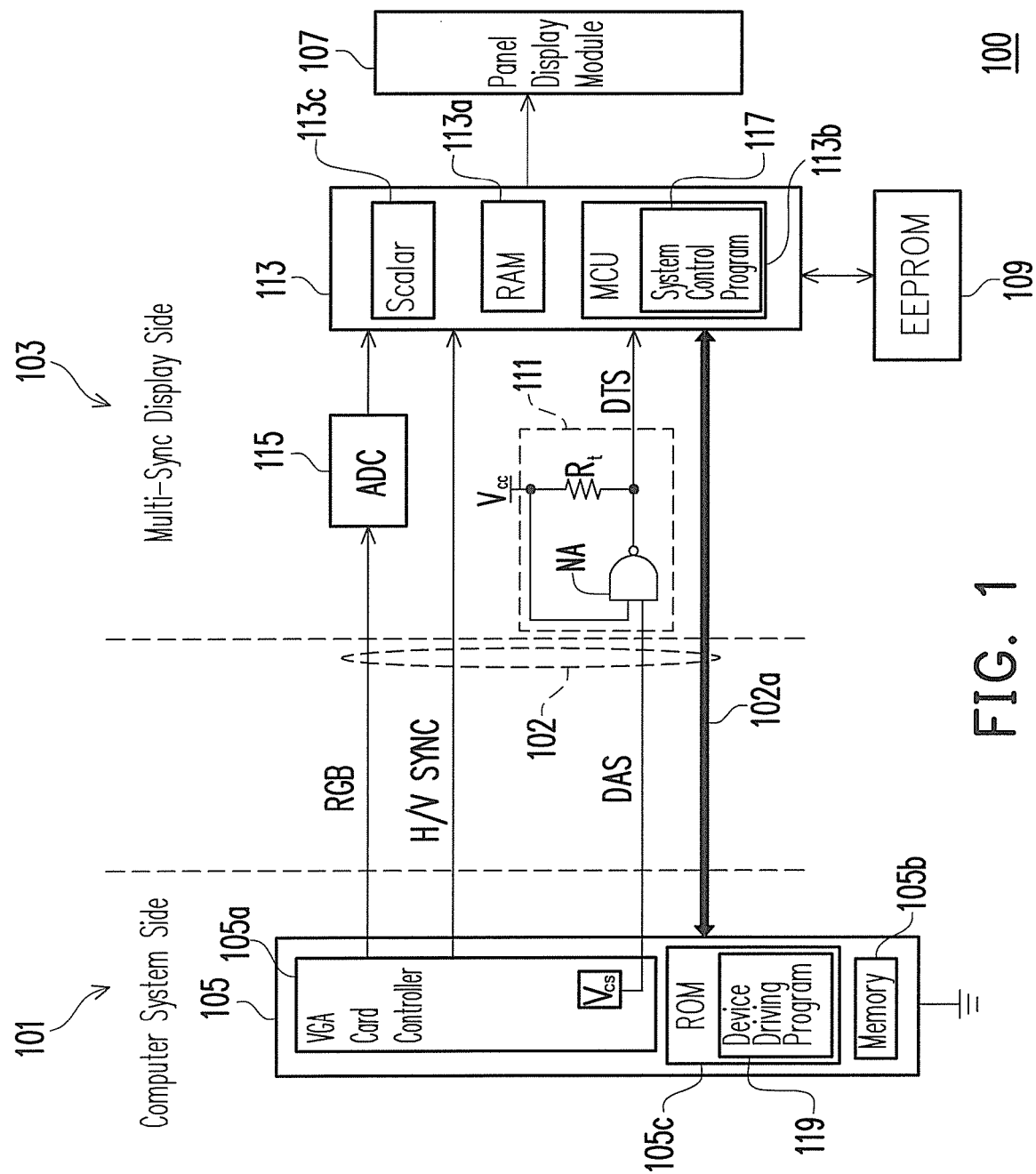
FIG. 1 is a system block diagram for fully-automatically aligning the quality of an image according to an exemplary embodiment of the present invention.

FIG. 1 is a block diagram of a system 100 for fully-automatically aligning the quality of the image according to an exemplary embodiment of the present invention. Referring to FIG. 1, the system 100 includes two independent systems of a computer system 101 and a multi-sync display 103. The multi-sync display 103 includes a panel display module 107, a memory 109 (e.g., an EEPROM though not limited thereto, other non-volatile memories could be chosen), a detection unit 111, and a processing chip 113 (e.g., internally having a memory 113a, a microcontroller (MCU) 113b for embedding and executing a system control program 117, and an image scalar chip 113c).

Moreover, the computer system 101 has a Video Graphic Array (VGA) display card 105 and a device driving program 119. The device driving program 119 is embedded in a memory 105c (e.g., in a non-volatile ROM) of the VGA display card 105, and the device driving program 119 is used for responding to a request of the system control program 117 of the multi-sync display 103. The VGA display card 105 provides an image signal RGB, a horizontal and vertical synchronization signal H/V SYNC, and a detecting start signal DAS through a VGA display card controller 105a disposed therein. The detecting start signal DAS is used for providing a signal indicating whether the two independent systems 101 and 103 are connected.

The VGA display card 105 has another memory 105b (e.g., a non-volatile memory) internally, used for storing a second computer host identification (ID) and an invalid computer host ID. In the exemplary embodiment, a memory configuration relationship in the memory 105b is approximately depicted as FIG. 2C. Of course, the computer system 101 may further include other components such as a CPU, a network card, an I/O interface, . . . etc.

In general, the multi-sync display 103 is connected with the VGA display card 105 through a display cable 102 (e.g., a VGA cable). The panel display module 107 is used for displaying an image. Besides storing a first computer host ID, a display ID, a counter ID, a color level flag, a preset color level alignment value, a plurality of preset timing flags, a plurality of preset timing parameters respectively corresponding to the preset timing flags, and a plurality of preset timing alignment values respectively corresponding to the preset timing parameters, the memory 109 also reserves a memory space to expand a plurality of self-set timing flags, a plurality of sets of self-set timing parameters respectively corresponding to the self-set timing flags, and a plurality of self-set timing alignment values respectively corresponding to the sets of self-set timing parameters, so as to form an EEPROM timing data table; In the exemplary embodiment, a memory configuration relationship of the EEPROM timing data table stored in the memory 109 is approximately depicted as FIG. 2A.

The detection unit 111 is used for detecting at least three detection mechanisms as follows but not limited thereto). The first detection mechanism is that detecting whether the multi-sync display 103 under a power-on state is connected to the VGA display card 105 in the computer system 101 under the power-on state through a display cable 102; the second detection mechanism is that detecting whether a cold start has occurred for the multi-sync display 103 connected to the VGA display card 105 in the computer system 101 under the power-on state through the display cable 102; and the third detection mechanism is that detecting whether the computer system 101 with the VGA display card 105 connected to the multi-sync display 103 under the power-on state through the display cable 102 has turned on. When one of the three aforesaid detection mechanisms has occurred, a detecting trigger signal DTS is provided to the processing chip 113 according to a detecting start signal DAS.

In the exemplary embodiment, the detection unit 111 is formed by a resistor Rt and an NAND gate NA. A terminal of the resistor Rt is coupled to a system voltage Vcc of the multi-sync display 103, and another terminal of the resistor Rt is directly coupled to the processing chip 113. Moreover, the NAND gate NA has a first terminal coupled to the system voltage Vcc, a second input terminal coupled to a system voltage Vcs of the VGA display card 105 in the computer system 101 through the display cable 102, and an output terminal coupled to the other terminal of the resistor Rt.

It should be noted that since the processing chip 113 merely processes digital signals, the analog image signal RGB provided by the VGA display card controller 105a should be converted by the analog to digital converter (ADC) 115 beforehand, and then the converted image signal RGB can be provided to the processing chip 113 for performing the subsequent signal processing. Therefore, the image signal RGB described below has/have all been processed by the ADC 115. However, since such a conversion technique is generally known by persons having ordinary skill in the art, a description thereof will be omitted herein.

The processing chip 113 is coupled to the panel display module 107, the memory 109, and the detection unit 111. The processing chip 113 includes a memory 113a disposed therein (for example, a RAM, but not limited thereto, other volatile memories could replace the memory 113a). The memory 113a is used for temporarily storing a reference timing parameter, a current timing parameter, and a current timing alignment value, so as to form a RAM timing data table. Herein, the reference timing parameter is a previous timing parameter or an invalid timing parameter. In the exemplary embodiment, a memory configuration relationship of the RAM timing data table stored in the memory 113a is approximately shows as FIG. 2B.

The embedded system control program 117 of the processing chip 113 is used for receiving and determining whether the detecting trigger signal DTS is transformed from a logic high state to a logic low state. In the exemplary embodiment, when the embedded system control program 117 of the processing chip 113 determines that the detecting trigger signal DTS is transformed from the logic high state to the logic low state, the embedded system control program 117 of the processing chip 113, through an information channel 102a (e.g., $I^2C$, and the invention is not limited thereto, described later in the specification) in the display cable 102, further determines whether the second computer host ID stored in the memory 105b and the first computer host ID stored in the memory 109 are identical.

When the embedded system control program 117 of the processing chip 113 determines that the second computer host ID stored in the memory 105b is not identical to the first computer host ID stored in the memory 109, the processing chip 113 receives the image signal RGB and the horizontal and vertical synchronization H/V SYNC signal (i.e., a valid timing signal) provided by the VGA display card controller 105a in the computer system 101 through the display cable 102, and performs a color level automatic alignment and a timing automatic alignment to the image signal RGB and/or the horizontal and vertical synchronization signal H/V SYNC, so as to configure all of the states of the color level flags, the preset timing flags, and the self-set timing flags, and obtain a color level automatic alignment value and a timing automatic alignment value to align the quality of the image displayed on the panel display module 107.

To be specific, once the multi-sync display 103 under the power-on state is connected with the computer host 101 under the power-on state through the display cable 102; or a cold start has occurred for the multi-sync display 103 connected to the VGA display card 105 in the computer system 101 under the power-on state through the display cable 102; or a hot or cold start has occurred for the computer system 101 with the VGA display card 105 connected to the multi-sync display 103 under the power-on state through the display connector cable 102; i.e., when one of the three aforesaid detection mechanisms has been activated/occurred, the embedded system control program 117 of the processing chip 113 immediately determines that the detecting trigger signal DTS is transformed from the high logic state to the low logic state.

Accordingly, through the information channel 102a in the display cable 102, the embedded system control program 117 of the processing chip 113 further determines whether the second computer host ID stored in the memory 105b matches with the first computer host ID stored in the memory 109. When the second computer host ID stored in the memory 105b is not identical to the first computer host ID stored in the memory 109, the embedded system control program 117 of the processing chip 113 activates the mechanism for fully-automatically aligning the quality of the image displayed on the panel display module 107.

However, when the second computer host ID stored in the memory 105b matches with the first computer host ID stored in the memory 109, the embedded system control program 117 of the processing chip 113 deactivates the mechanism for fully-automatically aligning the quality of the image displayed on the panel display module 107. In other words, repetitious alignments are not performed for a same computer system that has undergone corrections.

In the exemplary embodiment, when the embedded system control program 117 of the processing chip 113 determines that the detecting trigger signal DTS is transformed from the high logic state to the low logic state (e.g., when one of the three conditions herein has been met: both the multi-sync display 103 and the computer 101 are under the power-on state, and connected to each other for the first time through the display cable 102; or a cold start has occurred for the multi-sync display 103 connected to the VGA display card 105 in the computer system 101 under the power-on state through the display cable 102; or a hot or cold start has occurred for the computer system 101 with the VGA display card 105 connected to the multi-sync display 103 under the power-on state through the display connector cable 102), the embedded system control program 117 of the processing chip 113 first sends a read command through the information channel 102b to the computer system 101. When the embedded device driving program 119 of the computer system 101 receives the read command, the embedded device driving program 119 of the computer system 101 responds to the read command sent by the embedded system control program 117 of the processing chip 113 by sending the second computer host ID stored in the memory 105b to the processing chip 113 through the information channel 102b. Next, the embedded system control program 117 of the processing chip 113 compares whether the second computer host ID sent back by the embedded device driving program 119 of the computer system 101 matches with the first computer host ID in the EEPROM timing data table stored in the memory 109.

When the embedded system control program 117 of the processing chip 113 determines that the second computer host ID sent back by the embedded device driving program 119 of the computer system 101 is not identical to the first computer host ID in the EEPROM timing data table stored in the memory 109, the embedded system control program 117 of the processing chip 113 determines whether the second computer host ID is an invalid computer host ID according to the second computer host ID sent back by the embedded device driving program 119 of the computer system 101.

When the embedded system control program 117 of the processing chip 113 determines that the second computer host ID stored in the memory 105b is an invalid computer host ID, this represents a record in which the processing chip 113 has not configured any computer host ID to the computer system 101 for storage. Therefore, the embedded system control program 117 of the processing chip 113 sends a configuration command to the computer system 101 through the information channel 102b. Next, the embedded system control program 117 of the processing chip 113 combines the display ID and the counter ID in the EEPROM timing data table so as to obtain a new computer host ID. Accordingly, after the embedded system control program 117 obtains a new computer host ID to replace the first computer host ID in the EEPROM timing data table, "1" is added to the counter ID for the processing chip 113 to reserve another new computer host ID needed to configure another computer system.

Thereafter, the embedded system control program 117 of the processing chip 113 sends the previously combined new computer host ID to the computer host 101 through the information channel 102b. The embedded device driving program 119 of the computer system 101 responds to the configuration command sent by the embedded system control program 117 of the processing chip 113, and then stores the new computer host ID sent by the embedded system control program 117 of the processing chip 113 in the memory 105b. Accordingly, the second computer host ID stored in the memory 105b becomes a valid computer host ID, and computer host IDs stored in the first and second memories 105b and 109 become identical. Thereby, the multi-sync display 103 and the computer system 101 are configured as a pair.

In the exemplary embodiment, after the second computer host ID stored in the memory 105b has become a valid computer host ID, or when the embedded system control program 117 of the processing chip 113 determines that the second computer host ID sent back by the embedded device driving program of the computer system 101 is not identical to the first computer host ID in the EEPROM timing data table, the embedded system control program 117 of the processing chip 113 first sets all of the color level flags, the pre-set timing flags, and the self-set timing flags in the EEPROM timing table to "1". Next, the embedded system control program 117 performs the color level automatic alignment to the digital image signal RGB, so as to obtain the color level automatic alignment value to replace the preset color level alignment value in the EEPROM timing data table, and then clear the color level flags to "0". Next, the color level automatic alignment value is outputted to the panel display module 107.

Accordingly, when the processing chip 113 outputs the color level automatic alignment value to the panel display module 107, the processing chip 113 performs signal processing to the digital image signal RGB and the horizontal and vertical synchronization signal H/V SYNC, so as to obtain and store a current timing parameter in the memory 113a. Next, the embedded system control program 117 of the processing chip 113 compares whether the current timing parameter in the RAM timing data table matches with the reference timing parameter, so as to determine whether the horizontal and vertical synchronization signal H/V SYNC provided by the VGA display card controller 105a has changed.

In the exemplary embodiment, when the embedded system control program 117 of the processing chip 113 determines that the current timing parameter in the RAM timing data table does not match with the reference timing parameter, the embedded system control program 117 of the processing chip 113 determines that the horizontal and vertical synchronization signal H/V SYNC provided by the VGA display card controller 105a has changed. Since both the multi-sync display 103 and the computer 101 are connected to each other for the first time through the display cable 102; or a cold start has occurred for the first time for the multi-sync display 103 connected to the VGA display card 105 in the computer system 101 under the power-on state through the display cable 102; or a hot or cold start has occurred for the first time for the computer system 101 with the VGA display card 105 connected to the multi-sync display 103 under the power-on state through the display connector cable 102, the reference timing parameter in the RAM timing data table is an invalid timing parameter. Therefore, the embedded system control program 117 of the processing chip 113 determines that the current timing parameter does not match with the reference timing parameter (i.e., invalid timing parameter), so as to determine that the horizontal and vertical synchronization signal H/V SYNC provided by the VGA display card controller 105a has been changed.

When the embedded system control program 117 of the processing chip 113 determines that the horizontal and vertical synchronization signal H/V SYNC provided by the VGA display card controller 105a has been altered, the embedded system control program 117 of the processing chip 113 searches all the preset timing parameters and all the self-set timing parameters in the memory 109 (i.e., the EEPROM timing data table) for a match of the current timing parameter. When the match is found, the embedded system control program 117 of the processing chip 113 subsequently determines whether the preset timing flag or the self-set timing flag matching the current timing parameter has been cleared to "0".

In the exemplary embodiment, when the embedded system control program 117 of the processing chip 113 determines that the preset timing flag or the self-set timing flag matching the current timing parameter has been cleared to "0", the embedded system control program 117 of the processing chip 113 sets the preset timing alignment value or the self-set timing alignment value corresponding to the match of the current timing parameter as the current timing alignment value, and stores the current timing alignment value in the memory 113a. Accordingly, the timing automatic alignment value is obtained for transmission to the panel display module 107. Thereafter, the embedded system control program 117 of the processing chip 113 further replaces the invalid timing parameter with the current timing parameter, for use as the reference timing parameter.

However, when the embedded system control program 117 of the processing chip 113 determines that the preset timing flag or the self-set timing flag matching the current timing parameter has not been cleared to "0", the embedded system control program 117 of the processing chip 113 performs the timing automatic alignment to the image signal RGB and the horizontal and vertical synchronization signal H/V SYNC provided by the VGA display card controller 105a according to the current timing parameter, so as to obtain the timing automatic alignment value. Next, the embedded system control program 117 of the processing chip 113 replaces the preset timing alignment value or the self-set timing alignment value corresponding to the match of the current timing parameter with the timing automatic alignment value. Next, the embedded system control program 117 of the processing chip 113 clears the preset timing flag or the self-set timing flag matching the current timing parameter to "0", then sends the timing automatic alignment value to the panel display panel 107, and replaces the invalid timing parameter with the current timing parameter, for use as the reference timing parameter.

Moreover, when the embedded system control program 117 of the processing chip 113 finds no match among all the preset timing parameters and all the self-set timing parameters in the memory 109 (i.e., the EEPROM timing data table) with the current timing parameter, the embedded system control program 117 of the processing chip 113 adds an extra self-set timing flag in the reserved memory space of the memory 109. Moreover, according to the current timing parameter, an extra self-set timing parameter corresponding to the extra self-set timing parameter is duplicated and added in the memory space of the memory 109.

Thereafter, according to the current timing parameter, the embedded system control program 117 of the processing chip 113 performs the timing automatic alignment to the image signal RGB and the horizontal and vertical synchronization signal H/V SYNC provided by the VGA display card controller 105a, and thereby an extra self-set timing alignment value corresponding to the current timing parameter is obtained and added in the memory space of the memory 109. Next, the embedded system control program 117 of the processing chip 113 sets the extra self-set timing flag to "0", and sets the extra self-set timing alignment value as the current timing alignment value. Moreover, the extra self-set timing alignment value is stored in the memory 113a, so as to obtain the timing automatic alignment value for transmission to the panel display module 107. Thereafter, the embedded system control program 117 of the processing chip 113 replaces the invalid timing parameter with the current timing parameter, for use as the reference timing parameter temporarily stored in the memory 113a (i.e., the RAM timing data table).

In another aspect, when the embedded system control program 117 of the processing chip 113 determines that the second computer host ID sent back by the embedded device driving program 119 of the computer system 101 matches with the first computer host ID stored in the EEPROM timing data table, or determines that the detecting trigger signal DTS is continually maintained at the low logic state, the embedded system control program 117 of the processing chip 113 further determines whether the color level flag stored in the EEPROM timing data table is cleared to "0".

When the embedded system control program 117 of the processing chip 113 determines that the color level flag stored in the EEPROM timing data table has not been cleared to "0", this represents the embedded system control program 117 of the processing chip 113 has not performed the color level automatic alignment to the image signal RGB. Therefore, the embedded system control program 117 of the processing chip 113 performs the color level automatic alignment to the image signal RGB, and after accordingly obtaining the color level automatic alignment value to replace the preset color level alignment value stored in the EEPROM timing data table, clears the color level flag to "0". Thereafter, the color level automatic alignment value is sent/outputted to the panel display module 107.

Herein, after the processing chip 113 sends the color level automatic alignment value to the panel display module 107, the processing chip 113 performs signal processing to the image signal RGB and the horizontal and vertical synchronization signal H/V SYNC, so as to obtain a current timing parameter and store the current timing parameter in the memory 113a. Next, the embedded system control program 117 of the processing chip 113 determines whether the current timing parameter in the RAM timing data table matches with the reference timing parameter, so as to determine whether the horizontal and vertical synchronization signal H/V SYNC provided by the VGA display card controller 105a has changed.

In the exemplary embodiment, when the embedded system control program 117 of the processing chip 113 determines that the current timing parameter in the RAM timing data table does not match with the reference timing parameter, the embedded system control program 117 of the processing chip 113 determines that the horizontal and vertical synchronization signal H/V SYNC provided by the VGA display card controller 105a has been changed. When the embedded system control program 117 of the processing chip 113 determines that the horizontal and vertical synchronization signal H/V SYNC provided by the VGA display card controller 105a has been altered, the embedded system control program 117 of the processing chip 113 searches all the preset timing parameters and all the self-set timing parameters in the memory 109 (i.e., the EEPROM timing data table) for a match of the current timing parameter. When the match is found, the embedded system control program 117 of the processing chip 113 subsequently determines whether the preset timing flag or the self-set timing flag matching the current timing parameter has been cleared to "0".

In the exemplary embodiment, when the embedded system control program 117 of the processing chip 113 determines that the preset timing flag or the self-set timing flag matching the current timing parameter has been cleared to "0", the embedded system control program 117 of the processing chip 113 sets the preset timing alignment value or the self-set timing alignment value corresponding to the match of the current timing parameter as the current timing alignment value, and stores the current timing alignment value in the memory 113a. Accordingly, the timing automatic alignment value is obtained for transmission to the panel display module 107. Thereafter, the embedded system control program 117 of the processing chip 113 replaces the invalid timing parameter with the current timing parameter, for use as the reference timing parameter.

However, when the embedded system control program 117 of the processing chip 113 determines that the preset timing flag or the self-set timing flag matching the current timing parameter has not been cleared to "0", the embedded system control program 117 of the processing chip 113 performs the timing automatic alignment to the image signal RGB and the horizontal and vertical synchronization signal H/V SYNC provided by the VGA display card controller 105a according to the current timing parameter, so as to obtain the timing automatic alignment value. Next, the embedded system control program 117 of the processing chip 113 replaces the preset timing alignment value or the self-set timing alignment value corresponding to the match of the current timing parameter with the timing automatic alignment value. Thereafter, the embedded system control program 117 of the processing chip 113 clears the preset timing flag or the self-set timing flag corresponding to the match of the current timing parameter to "0", then sends the timing automatic alignment value to the panel display panel 107, and replaces the invalid timing parameter with the current timing parameter, for use as the reference timing parameter.

Moreover, when the embedded system control program 117 of the processing chip 113 finds no match among all the preset timing parameters and all the self-set timing parameters in the memory 109 (i.e., the EEPROM timing data table) with the current timing parameter, the embedded system control program 117 of the processing chip 113 adds an extra self-set timing flag in the reserved memory space of the memory 109. Moreover, according to the current timing parameter, an extra self-set timing parameter corresponding to the extra self-set timing parameter is duplicated and added in the memory space of the memory 109.

Thereafter, according to the current timing parameter, the embedded system control program 117 of the processing chip 113 performs the timing automatic alignment to the image signal RGB and the horizontal and vertical synchronization signal H/V SYNC provided by the VGA display card controller 105a, and thereby an extra self-set timing alignment value corresponding to the current timing parameter is obtained and added in the memory space of the memory 109. Next, the embedded system control program 117 of the processing chip 113 sets the extra self-set timing flag to "0", and sets the extra self-set timing alignment value as the current timing alignment value. Moreover, the extra self-set timing alignment value is stored in the memory 113a, so as to obtain the timing automatic alignment value for transmission to the panel display module 107. Thereafter, the embedded system control program 117 of the processing chip 113 replaces the invalid timing parameter with the current timing parameter, for use as the reference timing parameter temporarily stored in the memory 113a (i.e., the RAM timing data table).

When the embedded system control program 117 of the processing chip 113 determines that the color level flag stored in the EEPROM timing data table has been cleared to "0", this represents the embedded system control program 117 of the processing chip 113 has performed the color level automatic alignment to the digital image signal. Therefore, the embedded system control program 117 of the processing chip 113 merely performs signal processing to the digital image signal RGB and the horizontal and vertical synchronization signal H/V SYNC, so as to obtain a current timing parameter and store the current timing parameter in the memory 113a. Next, the embedded system control program 117 of the processing chip 113 determines whether the current timing parameter in the RAM timing data table matches with the reference timing parameter, so as to determine whether the horizontal and vertical synchronization signal H/V SYNC provided by the VGA display card controller 105a has changed.

In the exemplary embodiment, when the embedded system control program 117 of the processing chip 113 determines that the current timing parameter in the RAM timing data table does not match with the reference timing parameter, the embedded system control program 117 of the processing chip 113 determines that the horizontal and vertical synchronization signal H/V SYNC provided by the VGA display card controller 105a has been changed. When the embedded system control program 117 of the processing chip 113 determines that the horizontal and vertical synchronization signal H/V SYNC provided by the VGA display card controller 105a has been altered, the embedded system control program 117 of the processing chip 113 searches all the preset timing parameters and all the self-set timing parameters in the memory 109 (i.e., the EEPROM timing data table) for a match of the current timing parameter. When the match is found, the embedded system control program 117 of the processing chip 113 subsequently determines whether the preset timing flag or the self-set timing flag matching the current timing parameter has been cleared to "0".

In the exemplary embodiment, when the embedded system control program 117 of the processing chip 113 determines that the preset timing flag or the self-set timing flag matching the current timing parameter has been cleared to "0", the embedded system control program 117 of the processing chip 113 sets the preset timing alignment value or the self-set timing alignment value corresponding to the match of the current timing parameter as the current timing alignment value, and stores the current timing alignment value in the memory 113a. Accordingly, the timing automatic alignment value is obtained for transmission to the panel display module 107. Thereafter, the embedded system control program 117 of the processing chip 113 replaces the invalid timing parameter with the current timing parameter, for use as the reference timing parameter.

However, when the embedded system control program 117 of the processing chip 113 determines that the preset timing flag or the self-set timing flag matching the current timing parameter has not been cleared to "0", the embedded system control program 117 of the processing chip 113 performs the timing automatic alignment to the image signal RGB and the horizontal and vertical synchronization signal H/V SYNC provided by the VGA display card controller 105a according to the current timing parameter, so as to obtain the timing automatic alignment value. Next, the embedded system control program 117 of the processing chip 113 replaces the preset timing alignment value or the self-set timing alignment value corresponding to the match of the current timing parameter with the timing automatic alignment value. Thereafter, the embedded system control program 117 of the processing chip 113 clears the preset timing flag or the self-set timing flag corresponding to the match of the current timing parameter to "0", then sends the timing automatic alignment value to the panel display panel 107, and replaces the invalid timing parameter with the current timing parameter, for use as the reference timing parameter.

In another aspect, when the embedded system control program 117 of the processing chip 113 finds no match among all the preset timing parameters and all the self-set timing parameters in the memory 109 (i.e., the EEPROM timing data table) with the current timing parameter, the embedded system control program 117 of the processing chip 113 adds an extra self-set timing flag in the reserved memory space of the memory 109. Moreover, according to the current timing parameter, an extra self-set timing parameter corresponding to the extra self-set timing parameter is duplicated and added in the memory space of the memory 109.

Thereafter, according to the current timing parameter, the embedded system control program 117 of the processing chip 113 performs the timing automatic alignment to the image signal RGB and the horizontal and vertical synchronization signal H/V SYNC provided by the VGA display card controller 105a, and thereby an extra self-set timing alignment value corresponding to the current timing parameter is obtained and added in the memory space of the memory 109. Next, the embedded system control program 117 of the processing chip 113 sets the extra self-set timing flag to "0", and sets the extra self-set timing alignment value as the current timing alignment value. Moreover, the extra self-set timing alignment value is stored in the memory 113a, so as to obtain the timing automatic alignment value for transmission to the panel display module 107. Thereafter, the embedded system control program 117 of the processing chip 113 replaces the invalid timing parameter with the current timing parameter, for use as the reference timing parameter temporarily stored in the memory 113a (i.e., the RAM timing data table).

However, in the exemplary embodiment, when the embedded system control program 117 of the processing chip 113 determines that the current timing parameter in the RAM timing data table matches with the reference timing parameter (i.e., the reference timing parameter has been a previous timing parameter), then the embedded system control program 117 of the processing chip 113 determines that the horizontal and vertical synchronization signal H/V SYNC provided by the VGA display card controller 105a has not been changed. Hence, the embedded system control program 117 of the processing chip 113 does not perform quality alignment to the image displayed on the panel display module 107. In another aspect, if the image signal RGB and the horizontal and vertical synchronization signal H/V SYNC provided by the VGA display card controller 105a are invalid timing signals, then accordingly, quality alignment is also not performed for the image displayed on the panel display module 107.

In light of the foregoing description, when the reference timing parameter temporarily stored in the RAM timing data table does not match with the current timing parameter, the processing unit 113 performs the timing automatic alignment to the image signal RGB and the horizontal and vertical synchronization signal H/V SYNC provided by the VGA display card controller 105a, so as to obtain the timing automatic alignment value.

More specifically, when the embedded system control program 117 of the processing chip 113 performs for the first time a fully-automatic alignment to the quality of the image displayed on the panel display module 107, the embedded system control program 117 of the processing chip 113 obtains the current timing parameter, after calculation, in accordance with the received and valid timing signal, for storage in the RAM timing data table. However, when the current received timing signal used by the embedded system control program 117 of the processing chip 113 is an invalid timing signal, then the current timing parameter stored in the RAM timing data table becomes an invalid timing parameter. On the other hand, when the current received timing signal used by the embedded system control program 117 of the processing chip 113 is a valid timing signal, then the current timing parameter stored in the RAM timing data table replaces the reference timing parameter, such that the parameter values of the two parameters are always the same. Accordingly, the embedded system control program 117 of the processing chip 113 can determine whether the horizontal and vertical synchronization signal H/V SYNC provided by the VGA display card controller 105a has changed.

Furthermore, it should be noted that, according to the exemplary embodiment described above, the fully-automatic alignment mechanism performed on the quality of the image signal displayed on the panel display module 107 occurs when the detecting trigger signal DTS transforms from the high logic state to the low logic state, where the embedded system control program 117 of the processing chip 113 further determines whether the second computer host ID stored in the memory 105b matches with the first computer host ID stored in the memory 109.

However, in other embodiments of the present invention, the fully-automatic alignment mechanism performed on the quality of the image signal displayed on the panel display module 107 may also occur when the detecting trigger signal DTS transforms from the low logic state to the high logic state, where the embedded system control program 117 of the processing chip 113 further determines whether the second computer host ID stored in the memory 105b matches with the first computer host ID stored in the memory 109. An embodiment of the present embodiment may be implemented and defined according to a need in a practical design.

Moreover, although the aforementioned exemplary embodiment merely depicts the detection unit 111 as being implemented by the resistor Rt and the NAND gate NA, persons having ordinary skill in the art may adjust the circuit implementation of the detection unit 111 into any design, as long as the detection mechanism of the detection unit 111 can be achieved. Embodiments having such alternative implementations of the detection unit 111 are within the scope of the present invention for which protection is sought.

Figure 3:
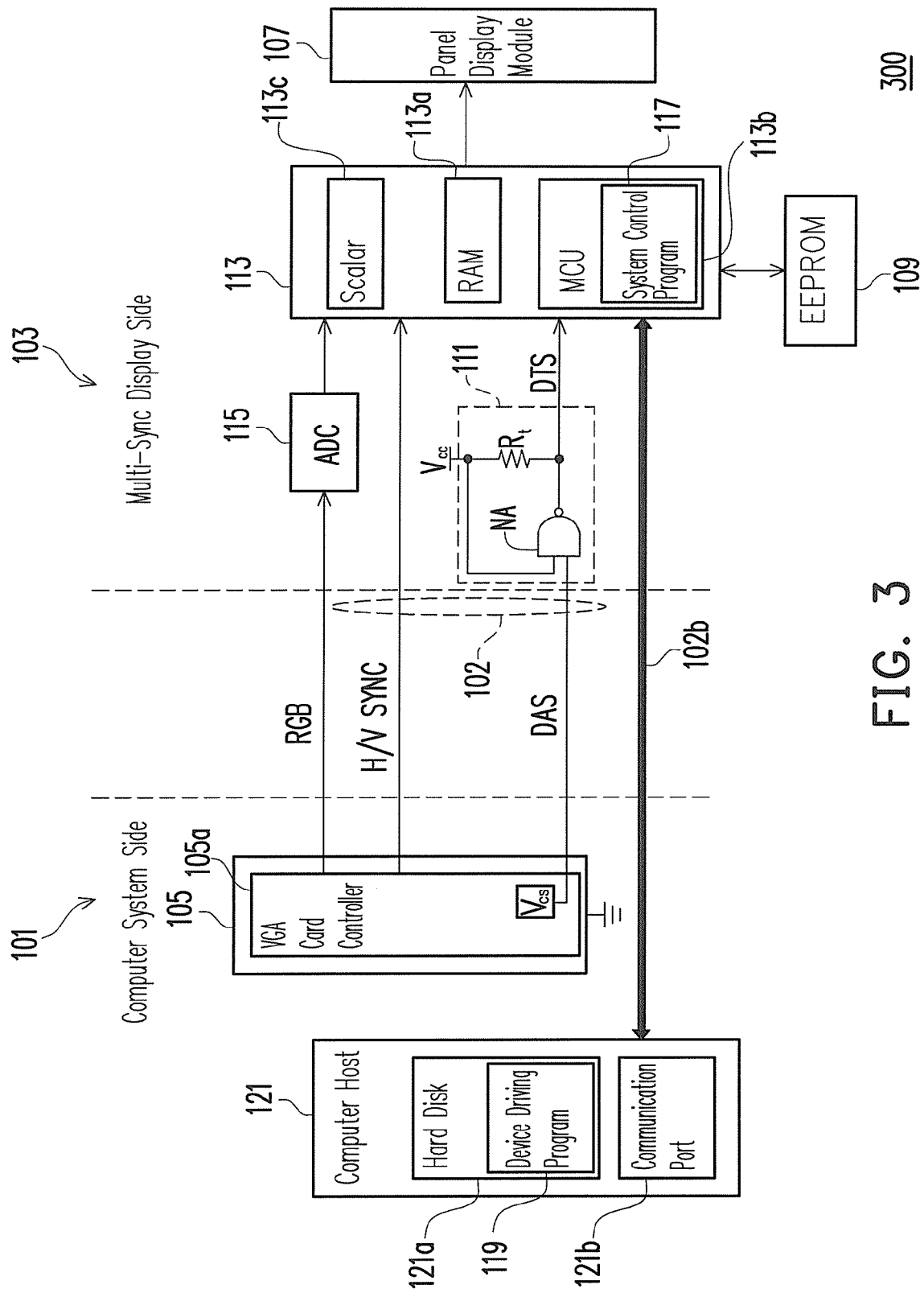
FIG. 3 is a system block diagram for fully-automatically aligning the quality of an image according to another exemplary embodiment of the present invention.

FIG. 3 is a block diagram of a system 300 for fully-automatically aligning the quality of the image according to another exemplary embodiment of the present invention. Referring to FIGS. 1 and 3 together, although the processing chip 113 of the system 100 transmits information through an I²C information channel 102b in the display cable 102, the mode of information transmission is not limited thereto. Namely, as shown in the system 300 depicted in FIG. 3, the technical effects of the aforementioned embodiment may be achieved by communicating with the multi-sync display 103 through a communication port 121b of a computer host 121 (e.g., RS232, USB) connected to a corresponding information channel 102b. Embodiments having such alternative implementations are within the scope of the present invention for which protection is sought.

Moreover, although the system 101 in the aforementioned embodiment embeds the device driving program 119 within the ROM 105c of the VGA display card 105, and stores the second computer host ID in the memory 105b in the VGA display card 105, the invention is not limited thereto. That is, as shown in the system 300 depicted in FIG. 3, the device driving program 119 embedded in the computer host 121 of the computer system 101 may be implemented in any storage device (e.g., a hard disk 121a), and the second computer host ID may also be stored in the hard disk 121a of the computer host 121. Therefore, after the system control program 117 of the processing chip 113 communicates with the relevant components of the computer system 101 (e.g., an CPU, a data bus, . . . etc.), the technical effects of the aforementioned embodiment may be achieved. Embodiments having such alternative implementations are within the scope of the present invention for which protection is sought.

Based on the disclosure of the aforesaid embodiment, a method for fully-automatically aligning the quality of an image is described below as a reference for persons of ordinary skill in the art.

Figure 4:
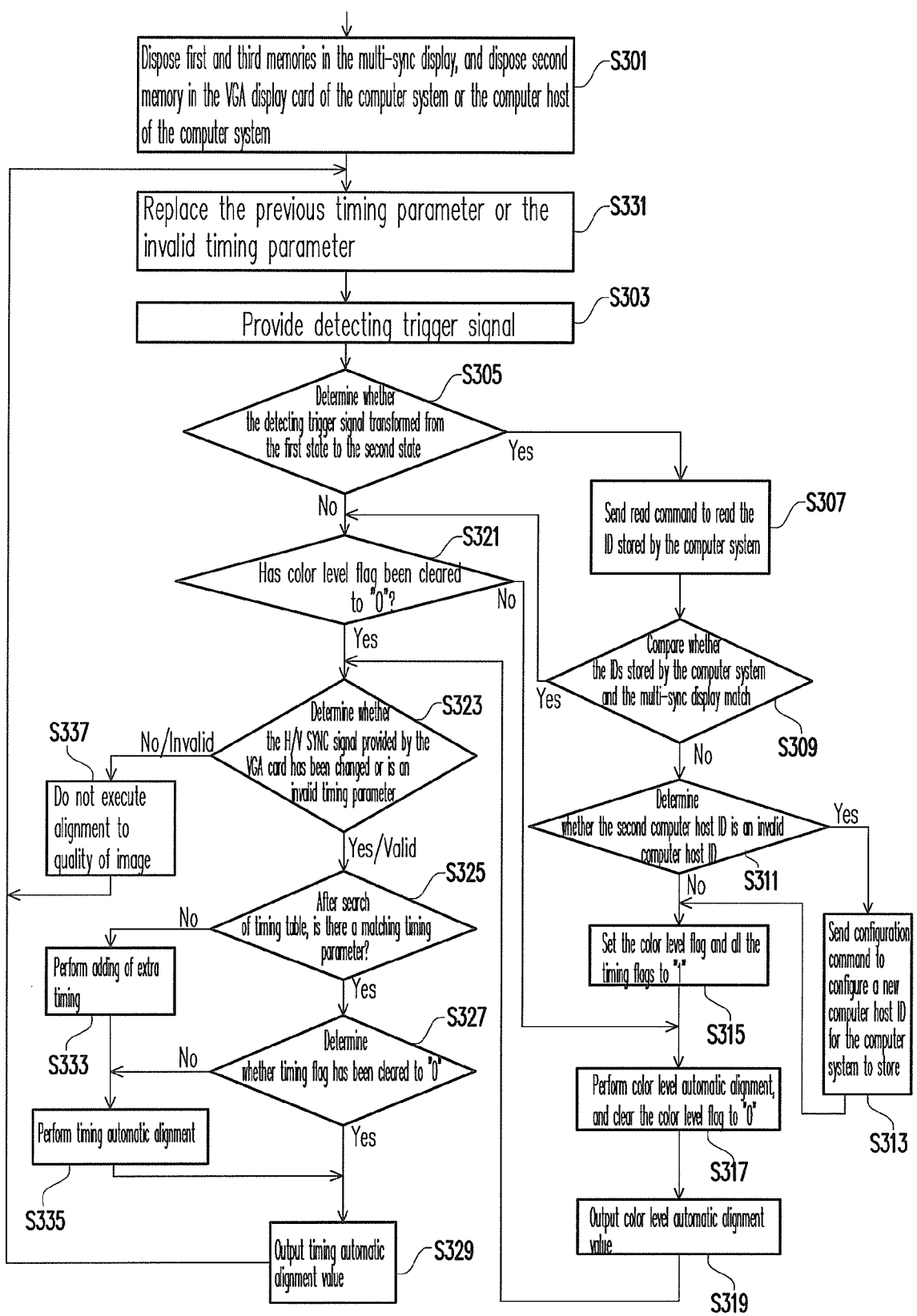
FIGS. 4 and 5 are flow charts respectively illustrating a system control program of a multi-sync display and an embedded device driving program of a computer system in a method for fully-automatically aligning the quality of an image according to an exemplary embodiment of the present invention.
Figure 5:
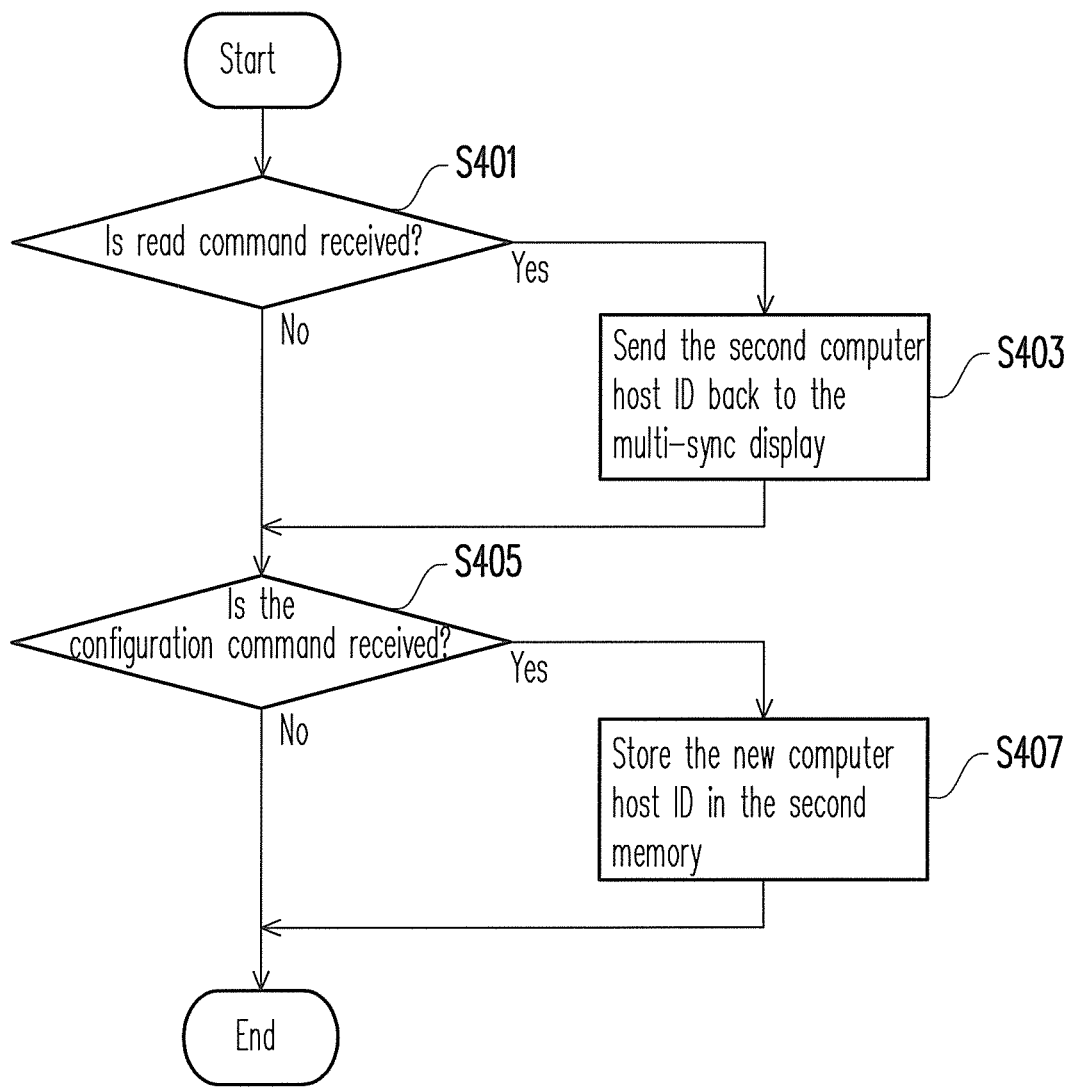

FIGS. 4 and 5 are flow charts respectively illustrating a system control program of a multi-sync display and an embedded device driving program of a computer system in a method for fully-automatically aligning the quality of an image according to an exemplary embodiment of the present invention. Referring to FIGS. 4 and 5 together, according to the exemplary embodiment, the method for fully-automatically aligning the quality of an image is suitable for implementation under two independent systems of a system control program in a processing chip of a multi-sync display, and an embedded device driving program of a computer system. The method includes the following steps. First, as depicted in a Step S301, a first memory and a third memory are disposed in the multi-sync display, and a second memory is disposed in the VGA display card or in the computer host of the computer system.

In the exemplary embodiment, the first memory (e.g., an EEPROM, though not limited thereto, other non-volatile memories may be chosen), besides being used for storing a first computer host ID, a display ID, a counter ID, a color level flag, a preset color level alignment value, a plurality of preset timing flags, a plurality of preset timing parameters respectively corresponding to the preset timing flags, and a plurality of preset timing alignment values respectively corresponding to the preset timing parameters, the first memory also reserves a memory space to expand a plurality of self-set timing flags, a plurality of self-set timing parameters respectively corresponding to the self-set timing flags, and a plurality of self-set timing alignment values respectively corresponding to the sets of self-set timing parameters, so as to form an EEPROM timing data table.

The second memory (e.g., a non-volatile memory or a hard disk) is used for storing the second computer host ID, and the VGA display card is used to provide at least the image signal and the horizontal and vertical synchronization signal.

The third memory (e.g., a RAM though not limited thereto, other volatile memories may be chosen) is used for temporarily storing a reference timing parameter, a current timing parameter, and a current timing alignment value, so as to form a RAM timing data table. Herein, the implementation of a Step 331 determines whether the reference timing parameter is a previous timing parameter or an invalid timing parameter. Moreover, the processing chip used for implementing the method of the exemplary embodiment includes the microcontroller for executing the system control program, the image scalar chip, and the third memory.

Thereafter, according to a Step S303, three detection mechanisms described below are detected. The first detection mechanism is that detecting whether the multi-sync display under the power-on state is connected to the VGA display card in the computer system under the power-on state through the display cable. The second detection mechanism is that detecting whether a cold start has occurred for the multi-sync display connected to the VGA display card in the computer system under the power-on state through the display cable. The third detection mechanism is that detecting whether a hot or cold start has occurred for the computer system with the VGA display card connected to the multi-sync display under the power-on state through the display connector cable. When one of the three detection mechanisms has occurred, a detecting trigger signal is provided.

In the exemplary embodiment, the Step S303 includes disposing a resistor and an NAND gate in the multi-sync display. Thereafter, a terminal of the resistor and a first input terminal of the NAND gate are coupled to the system voltage of the multi-sync display. Moreover, another terminal of the resistor and an output terminal of the NAND gate are directly coupled to the processing chip of the multi-sync display. Furthermore, a second input terminal of the NAND gate is coupled to the system voltage of the VGA display card in the computer system through the display cable.

Therefore, when the multi-sync display under the power-on state is connected to the VGA display card in the computer system under the power-on state through the display cable, or when a cold start has occurred for the multi-sync display connected to the VGA display card in the computer system under the power-on state through the display cable, or a hot or cold start has occurred for the computer system with the VGA display card connected to the multi-sync display under the power-on state through the display connector cable, a detecting trigger signal transformed from a first state to a second state or a detecting trigger signal maintained at the second state is provided to the processing chip.

Next, according to a Step S305, whether the detecting trigger signal has transformed from the first state (e.g., the logic high state) to the second state (e.g., the logic low state) is determined. When the detecting trigger signal is determined as transformed from the first state to the second state, a Step S307 is performed, in which the read command is sent through the information channel (e.g., I$^2$C though not limited thereto) to the computer system. According to a Step S401, the computer system continually determines whether it has received the read command. When the computer system determines that it has received the read command, the computer system performs a Step S403, in which the read command is responded to by sending the second computer host ID to the multi-sync display through the information channel in the display cable.

Thereafter, according to a Step S309, whether the second computer host ID sent by the computer host matches with the first computer host ID stored in the EEPROM timing data table is compared. When the first and second computer host IDs are not identical, a Step S311 is performed, namely, whether the first computer host ID is an invalid computer host ID is determined according to the first computer host ID sent by the computer system.

When the first computer host ID is determined to be an invalid computer host ID, a step S313 is performed, namely, a configuration command is sent to the computer system through the information channel in the display cable. The computer system continually determines whether it has received the configuration command according to a Step S405. Next, the display ID and the counter ID in the EEPROM timing data table are combined. Accordingly, after a new computer host ID is obtained to replace the second computer host ID in the EEPROM timing data table, "1" is added to the counter ID to reserve another new computer host ID needed to configure another computer system. Thereafter, the new computer host ID is transmitted to the computer system through the information channel in the display cable.

Accordingly, when the computer system determines that it has received the configuration command, the computer system responds to the configuration command. As described in a Step S407, the new computer host ID is stored in the second memory, such that the first computer host ID becomes a valid computer host ID, and first and second computer host IDs respectively stored in the first and second memories become identical. Thereby, the multi-sync display and the computer system are configured as a pair.

In the exemplary embodiment, after the first computer host ID becomes a valid computer host ID, or it is determined that the first computer host ID does not match with the second computer host ID, then a Step S315 follows. As described in the Step S315, the color level flag, all the preset timing flags, and all the self-set timing flags are set to "1". Next, as described in a Step S317, the color level automatic alignment is performed to the image signal provided by the VGA display card, so that after obtaining the color level automatic alignment value to replace the preset color level alignment value in the EEPROM timing data table, the color level flag is cleared to "0". Thereafter, as described in a Step S319, the color level automatic alignment value is transmitted to the display panel module of the multi-sync display.

After the color level automatic alignment value is sent to the panel display module, a Step S323 is performed, namely, signal processing is first performed on the image signal and the horizontal and vertical synchronization signal provided by the VGA display card in the computer system, so as to obtain a current timing parameter, and store the current timing parameter in the RAM timing data table. Next, whether the current timing parameter matches with the reference timing parameter is determined, so as to determine whether the horizontal and vertical synchronization signal provided by the VGA display card in the computer system has changed.

When the current timing parameter does not match with the reference timing parameter, it is determined that the horizontal and vertical synchronization signal provided by the VGA display card in the computer system has changed. Accordingly, a Step S325 is performed, in which all the preset timing parameters and all the self-set timing parameters in the second memory (i.e., the EEPROM timing data table) are searched for a match of the current timing parameter. When the match is found, a Step S327 is performed, in which whether the preset timing flag or the self-set timing flag matching the current timing parameter has been cleared to "0" is determined.

In the exemplary embodiment, when the preset timing flag or the self-set timing flag matching the current timing parameter has been determined as cleared to "0", a Step S329 is performed, namely, the preset timing alignment value or the self-set timing alignment value corresponding to the match of the current timing parameter is set as the current timing alignment value, and stored in the RAM timing data table of the third memory. Accordingly, the timing automatic alignment value is obtained for transmission to the panel display module. Thereafter, a Step S331 is performed, in which the previous timing parameter or the invalid timing parameter is replaced with the current timing parameter, for use as the reference timing parameter.

In another aspect, when it is determined that the preset timing flag or the self-set timing flag matching the current timing parameter has not been cleared to "0", a Step S335 is performed, namely, according to the current timing parameter, the timing automatic alignment is performed to the image signal and the horizontal and vertical synchronization signal provided by the VGA display card in the computer system, so as to obtain the timing automatic alignment value. Thereafter, the preset timing alignment value or the self-set timing alignment value corresponding to the match of the current timing parameter is replaced with the timing automatic alignment value, and the preset timing flag or the self-set timing flag corresponding to the match of the current timing parameter is cleared to "0".

Next, a Step S329 performed, in which the timing automatic alignment value is transmitted to the panel display module. Then, a Step S331 is performed, in which the previous timing parameter or the invalid timing parameter is replaced with the current timing parameter, for use as the reference timing parameter. However, when Step S325 results in no match, then a Step S333 is performed, in which an extra self-set timing flag is added in the reserved memory space of the second memory. Additionally, according to the current timing parameter, an extra self-set timing parameter corresponding to the extra self-set timing flag is added in the EEPROM timing data table of the second memory.

Next, a Step S335 is performed, in which according to the current timing parameter, the timing automatic alignment is performed to the image signal and the horizontal and vertical synchronization signal provided by the VGA display card in the computer system, and thereby an extra self-set timing alignment value corresponding to the current timing parameter is obtained and added in the EEPROM timing data table of the second memory. Then, the extra self-set timing flag is set to "0". Next, a Step S329 is performed, in which the extra self-set timing alignment value is set as the current timing alignment value and stored in the RAM timing data table of the third memory, so as to obtain the timing automatic alignment value for transmission to the panel display module. Then, a Step S331 is performed, in which the previous timing parameter or the invalid timing parameter is replaced with the current timing parameter, for use as the reference timing parameter temporarily stored in the RAM timing data table of the third memory.

In the exemplary embodiment, when the Step S323 has a comparison result in which the current timing parameter matches with the reference timing parameter, it is determined that the horizontal and vertical synchronization signal provided by the VGA display card in the computer system has not changed. Accordingly, a Step S337 is performed, in which quality alignment of the image displayed on the panel display module is not executed. In another aspect, in the Step S323, when the image signal and the horizontal and vertical synchronization signal provided by the VGA display card in the computer system are invalid timing signals, then accordingly the Step S337 is performed, in which quality alignment is not executed for the image displayed on the panel display module.

In another aspect, when the Step S309 has a comparison result in which the first and second computer host IDs match with each other, or the detecting trigger signal is determined as being maintained at the second state, then a Step S321 is performed, which determines whether the color level flag has been cleared to "0". When it is determined that the color level flag has not been cleared to "0", then the Steps S317 and S319, as well as Steps S323 to 5337 are repeatedly executed, hence further description thereof is omitted herein. On the other hand, when it is determined that the color level flag has been cleared to "0", then the Steps S323 to S337 are repeatedly executed, and therefore further description thereof is also omitted herein.

Furthermore, in the method for fully-automatically aligning the quality of the image displayed on the multi-sync display according to the exemplary embodiment, before performing the color level automatic alignment and the timing automatic alignment to the image signal and the horizontal and vertical synchronization signal, the image signal needs to be converted from analog to digital. However, since such a conversion technique is generally known by persons having ordinary skill in the art, a description thereof will be omitted herein.

In light of the foregoing description, in the system and the method for fully-automatically aligning the quality of the image according to the embodiments of the present invention, the multi-sync display is used to process the video signals (e.g., the image signal and the horizontal and vertical synchronization signal) provided by the VGA display card in the computer system through a system control program itself, and furthermore, the computer host ID stored in the computer host or the VGA display card is compared with the computer host ID stored in the multi-sync display to determine whether the computer host IDs match by a device driving program built-in/embedded-in the computer system responding to the request of the system control program, so as to prevent performing repetitious alignments to the same computer system. Accordingly, fully-automatic alignment to the quality of the image displayed on the multi-sync display can be achieved. Therefore, even if the multi-sync display is setup with a foreign computer host having a foreign VGA display card, and even if the setup is placed at a location unreachable by the user, the problem of conventional techniques requiring the user to press a button on the multi-sync display to alignment the quality of the displayed image can be prevented.

Though the present invention has been disclosed above by the embodiments, they are not intended to limit the present invention. Anybody skilled in the art can make some modifications and variations without departing from the spirit and scope of the present invention. Therefore, the protecting range of the present invention falls in the appended claims.

What is claimed is:

1. A method for fully-automatically aligning a quality of an image, comprising:
    disposing a first memory and a third memory in a multi-sync display, wherein:
        the first memory is used for storing a first computer host identification (ID), a display ID, a counter ID, a color level flag, a preset color level alignment value, a plurality of preset timing flags, a plurality of preset timing parameters respectively corresponding to the preset timing flags, and a plurality of preset timing alignment values respectively corresponding to the preset timing parameters, and reserving a memory space to expand a plurality of self-set timing flags, a plurality of self-set timing parameters respectively corresponding to the self-set timing flags, and a plurality of self-set timing alignment values respectively corresponding to the self-set timing parameters, so as to form a first timing data table; and
        the third memory is used for temporarily storing a reference timing parameter, a current timing parameter, and a current timing alignment value, so as to form a second timing data table, and the reference timing parameter is a previous timing parameter or an invalid timing parameter;
    disposing a second memory in a video graphic array (VGA) display card of a computer system or a computer host of the computer system, wherein the second memory is used for storing a second computer host ID, and the VGA display card is used for providing an image signal and a horizontal and vertical synchronization signal;
    detecting at least three detection mechanisms as follows, wherein: a first detection mechanism in the at least three detection mechanisms is that detecting whether the multi-sync display under a power-on state is connected to the VGA display card in the computer system under the power-on state through a display cable; a second detection mechanism in the at least three detection mechanisms is that detecting whether a cold start has occurred for the multi-sync display connected to the VGA display card in the computer system under the power-on state through the display cable; a third detection mechanism in the at least three detection mechanisms is that detecting whether a cold or hot start has occurred for the computer system with the VGA display card connected to the multi-sync display under the power-on state through the display cable; and when one of the three detection mechanisms has occurred, providing a detecting trigger signal;
    executing a system control program through the multi-sync display, so when the detecting trigger signal has transformed from a first state to a second state, whether the first computer host ID matches with the second computer host ID is determined through an information channel; and
    responding to a request of the system control program by executing a device driving program through the computer system, so when the first and second computer host IDs are determined as different, a color level automatic alignment and a timing automatic alignment are performed to the image signal and/or the horizontal and vertical synchronization signal provided by the VGA display card in the computer system, so as to configure states of the color level flag, the preset timing flags, and the self-set timing flags, and obtain a color level automatic alignment value and a timing automatic alignment value to align a quality of an image displayed on a panel display module of the multi-sync display,
    wherein when the detecting trigger signal has transformed from the first state to the second state, the method executes the following steps:
        sending a read command to the computer system through the information channel, so when the computer system receives the read command, the computer system responds to the read command by sending the second computer host ID back to the multi-sync display through the information channel; and
        comparing whether the second computer host ID sent back by the computer system matches with the first computer host ID.

2. The method as claimed in claim 1, wherein when the first and second computer host IDs are determined as different, the method further executes the following step:
    determining whether the second computer host ID is an invalid computer host ID according to the second computer host ID sent back by the computer system.

3. The method as claimed in claim 2, wherein when the second computer host ID is determined to be the invalid computer host ID, the method further executes the following steps:

sending a configuration command to the computer system through the information channel;

combining the display ID and the counter ID, and after accordingly obtaining a new computer host ID to replace the first computer host ID, adding "1" to the counter ID to reserve another new computer host ID needed to configure another computer system; and sending the new computer host ID to the computer system through the information channel, and the computer system responds to the configuration command by storing the new computer host ID in the second memory, so that the second computer host ID becomes a valid computer host ID.

4. The method as claimed in claim 3, wherein after the second computer host ID becomes the valid computer host ID, or the second computer host ID is determined as different from the first computer host ID, the method further executes the following steps:

setting the color level flag, the preset timing flags, and the self-set timing flags to "1";

performing the color level automatic alignment to the image signal, and after accordingly obtaining the color level automatic alignment value to replace the preset color level alignment value, clearing the color level flag to "0"; and outputting the color level automatic alignment value to the panel display module.

5. The method as claimed in claim 4, wherein after the color level automatic alignment value is sent to the panel display module, the method further executes the following steps:

performing signal processing to the image signal and the horizontal and vertical synchronization signal provided by the VGA display card in the computer system, so as to obtain the current timing parameter and store the current timing parameter in the third memory; and comparing whether the current timing parameter matches with the reference timing parameter, so as to determine whether the horizontal and vertical synchronization signal provided by the VGA display card in the computer system has changed.

6. The method as claimed in claim 5, wherein when the current timing parameter is compared as different from the reference timing parameter, the horizontal and vertical synchronization signal provided by the VGA display card in the computer system is determined as changed, and the method further executes the following step:

searching the preset timing parameters and the self-set timing parameters in the first timing data table for a match of the current timing parameter.

7. The method as claimed in claim 6, wherein when the match is found, the method further executes the following step:

determining whether the preset timing flag or the self-set timing flag matching the current timing parameter has been cleared to "0", wherein when the preset timing flag or the self-set timing flag matching the current timing parameter is determined as cleared to "0", the method further executes the following step:

setting the preset timing alignment value or the self-set timing alignment value corresponding to the match of the current timing parameter as the current timing alignment value and storing in the third memory, so as to obtain the timing automatic alignment value for transmission to the panel display module; and replacing the previous timing parameter or the invalid timing parameter with the current timing parameter, for use as the reference timing parameter; and wherein when the preset timing flag or the self-set timing flag matching the current timing parameter is determined not to be cleared to "0", the method further executes the following steps:

performing the timing automatic alignment to the image signal and the horizontal and vertical synchronization signal provided by the VGA display card in the computer system according to the current timing parameter, so as to obtain the timing automatic alignment value;

replacing the preset timing alignment value or the self-set timing alignment value corresponding to the match of the current timing parameter with the timing automatic alignment value;

clearing the preset timing flag or the self-set timing flag corresponding to the match of the current timing parameter to "0"; and outputting the timing automatic alignment value to the panel display module, and replacing the previous timing parameter or the invalid timing parameter with the current timing parameter, for use as the reference timing parameter.

8. The method as claimed in claim 6, wherein when the match is not found, the method further executes the following step:

adding an extra self-set timing flag in the memory space of the first memory;

adding an extra self-set timing parameter corresponding to the extra self-set timing flag according to the current timing parameter, and adding the extra self-set timing parameter in the first timing data table of the first memory;

performing the timing automatic alignment to the image signal and the horizontal and vertical synchronization signal provided by the VGA display card in the computer system according to the current timing parameter, so as to obtain an extra self-set timing alignment value corresponding to the current timing parameter and add in the first timing data table of the first memory;

setting the extra self-set timing flag to "0";

setting the extra self-set timing alignment value as the current timing alignment value and storing in the second timing data table of the third memory, so as to obtain the timing automatic alignment value for transmission to the panel display module; and replacing the previous timing parameter or the invalid timing parameter with the current timing parameter, for use as the reference timing parameter temporarily stored in the second timing data table of the third memory.

9. The method as claimed in claim 5, wherein when the current timing parameter is determined as matching the reference timing parameter, the horizontal and vertical synchronization signal provided by the VGA display card in the computer system is determined as not changed, and when the horizontal and vertical synchronization signal provided by the VGA display card in the computer system is determined as not changed or is an invalid timing signal, the method further executes the following step:

not performing the alignment to the quality of the image.

10. The method as claimed in claim 1, wherein when the first and second computer host IDs are determined as the same, or the detecting trigger signal is determined as continually maintained at the second state, the method further executes the following step:

determining whether the color level flag has been cleared to "0", wherein when the color level flag is determined as not been cleared to "0", performing the color level automatic alignment to the image signal, and after accordingly obtaining the color level automatic alignment value to replace the preset color level alignment value, clearing the color level flag to "0", and outputting the color level automatic alignment value to the panel display module; and when the color level flag is determined as cleared to "0", performing signal processing to the image signal and the horizontal and vertical synchronization signal provided by the VGA display card in the computer system, so as to obtain the current timing parameter and store the current timing parameter in the third memory, and compare whether the current timing parameter matches with the reference timing parameter, so as to determine whether the horizontal and vertical synchronization signal provided by the VGA display card in the computer system has changed.

11. The method as claimed in claim 10, wherein after the color level automatic alignment value is sent to the panel display module, the method further executes the following steps:

performing signal processing to the image signal and the horizontal and vertical synchronization signal provided by the VGA display card in the computer system, so as to obtain the current timing parameter and store the current timing parameter in the third memory; and comparing whether the current timing parameter matches with the reference timing parameter, so as to determine whether the horizontal and vertical synchronization signal provided by the VGA display card in the computer system has changed.

12. The method as claimed in claim 11, wherein when the current timing parameter is compared as different from the reference timing parameter, the horizontal and vertical synchronization signal provided by the VGA display card in the computer system is determined as changed, and the method further executes the following step:

searching the preset timing parameters and the self-set timing parameters in the first timing data table for a match of the current timing parameter.

13. The method as claimed in claim 12, wherein when the match is found, the method further executes the following step:

determining whether the preset timing flag or the self-set timing flag matching the current timing parameter has been cleared to "0", wherein when the preset timing flag or the self-set timing flag matching the current timing parameter is determined as cleared to "0", the method further executes the following steps:

setting the preset timing alignment value or the self-set timing alignment value corresponding to the match of the current timing parameter as the current timing alignment value and storing in the second timing data table of the third memory, so as to obtain the timing automatic alignment value for transmission to the panel display module; and replacing the previous timing parameter or the invalid timing parameter with the current timing parameter, for use as the reference timing parameter; and when the preset timing flag or the self-set timing flag matching the current timing parameter is determined as not cleared to "0", the method further executes the following steps:

performing the timing automatic alignment to the image signal and the horizontal and vertical synchronization signal provided by the VGA display card in the computer system according to the current timing parameter, so as to obtain the timing automatic alignment value;

replacing the preset timing alignment value or the self-set timing alignment value corresponding to the match of the current timing parameter with the timing automatic alignment value;

clearing the preset timing flag or the self-set timing flag corresponding to the match of the current timing parameter to "0"; and outputting the timing automatic alignment value to the panel display module, and replacing the previous timing parameter or the invalid timing parameter with the current timing parameter, for use as the reference timing parameter.

14. The method as claimed in claim 12, wherein when the match is not found, the method further executes the following steps:

adding an extra self-set timing flag in the memory space of the first memory;

adding an extra self-set timing parameter corresponding to the extra self-set timing flag according to the current timing parameter, and adding the extra self-set timing parameter in the first timing data table of the first memory;

performing the timing automatic alignment to the image signal and the horizontal and vertical synchronization signal provided by the VGA display card in the computer system according to the current timing parameter, so as to obtain an extra self-set timing alignment value corresponding to the current timing parameter and add in the first timing data table of the first memory;

setting the extra self-set timing flag to "0";

setting the extra self-set timing alignment value as the current timing alignment value and storing in the second timing data table of the third memory, so as to obtain the timing automatic alignment value for transmission to the panel display module; and replacing the previous timing parameter or the invalid timing parameter with the current timing parameter, for use as the reference timing parameter temporarily stored in the second timing data table of the third memory.

15. The method as claimed in claim 11, wherein when the current timing parameter is determined as matching the reference timing parameter, the horizontal and vertical synchronization signal provided by the VGA display card in the computer system is determined as not changed, and when the horizontal and vertical synchronization signal provided by the VGA display card in the computer system is determined as not changed or is an invalid timing signal, the method further executes the following step:

not performing the alignment to the quality of the image.

16. The method as claimed in claim 10, wherein when the current timing parameter is compared as different from the reference timing parameter, the horizontal and vertical synchronization signal provided by the VGA display card in the computer system is determined as changed, and the method further executes the following step:

searching the preset timing parameters and the self-set timing parameters in the first timing data table for a match of the current timing parameter.

17. The method as claimed in claim 16, wherein when the match is found, the method further executes the following step:
   determining whether the preset timing flag or the self-set timing flag matching the current timing parameter has been cleared to "0",
   wherein when the preset timing flag or the self-set timing flag matching the current timing parameter is determined as cleared to "0", the method further executes the following steps:
      setting the preset timing alignment value or the self-set timing alignment value corresponding to the match of the current timing parameter as the current timing alignment value and storing in the second timing data table of the third memory, so as to obtain the timing automatic alignment value for transmission to the panel display module; and
      replacing the previous timing parameter or the invalid timing parameter with the current timing parameter, for use as the reference timing parameter; and
   when the preset timing flag or the self-set timing flag matching the current timing parameter is determined as not cleared to "0", the method further executes the following steps:
      performing the timing automatic alignment to the image signal and the horizontal and vertical synchronization signal provided by the VGA display card in the computer system according to the current timing parameter, so as to obtain the timing automatic alignment value;
      replacing the preset timing alignment value or the self-set timing alignment value corresponding to the match of the current timing parameter with the timing automatic alignment value;
      clearing the preset timing flag or the self-set timing flag corresponding to the match of the current timing parameter to "0"; and
      outputting the timing automatic alignment value to the panel display module, and replacing the previous timing parameter or the invalid timing parameter with the current timing parameter, for use as the reference timing parameter.

18. The method as claimed in claim 16, wherein when the match is not found, the method further executes the following steps:
   adding an extra self-set timing flag in the memory space of the first memory;
   adding an extra self-set timing parameter corresponding to the extra self-set timing flag according to the current timing parameter, and adding the extra self-set timing parameter in the first timing data table of the first memory;
   performing the timing automatic alignment to the image signal and the horizontal and vertical synchronization signal provided by the VGA display card in the computer system according to the current timing parameter, so as to obtain an extra self-set timing alignment value corresponding to the current timing parameter and add in the first timing data table of the first memory;
   setting the extra self-set timing flag to "0";
   setting the extra self-set timing alignment value as the current timing alignment value and storing in the second timing data table of the third memory, so as to obtain the timing automatic alignment value for transmission to the panel display module; and
   replacing the previous timing parameter or the invalid timing parameter with the current timing parameter, for use as the reference timing parameter temporarily stored in the second timing data table of the third memory.

19. The method as claimed in claim 1, wherein the steps of detecting the at least three detection mechanisms comprise:
   disposing a resistor and an NAND gate in the multi-sync display;
   coupling a terminal of the resistor and a first input terminal of the NAND gate to a system voltage of the multi-sync display;
   directly coupling another terminal of the resistor and an output terminal of the NAND gate to a processing chip of the multi-sync display;
   coupling a second input terminal of the NAND gate to a system voltage of the VGA display card in the computer system through the display cable; and
   when one of the at least three detection mechanisms has occured, providing the detecting trigger signal transformed from the first state to the second state, or providing the detecting trigger signal continually maintained at the second state to the processing chip.

* * * * *